United States Patent
Cooper et al.

(10) Patent No.: US 7,062,147 B2
(45) Date of Patent: Jun. 13, 2006

(54) TIME SHIFTING BY CONCURRENTLY RECORDING AND PLAYING AN AUDIO STREAM

(75) Inventors: Frederick J. Cooper, Portland, OR (US); Dennis M. O'Connor, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1139 days.

(21) Appl. No.: 09/726,992

(22) Filed: Nov. 30, 2000

(65) Prior Publication Data

US 2001/0000540 A1    Apr. 26, 2001

Related U.S. Application Data

(63) Continuation-in-part of application No. 08/996,535, filed on Dec. 23, 1997, now Pat. No. 6,480,667.

(51) Int. Cl.
*H04N 5/76* (2006.01)
*H04N 5/781* (2006.01)
*G11B 5/00* (2006.01)

(52) U.S. Cl. ............... 386/46; 386/125; 360/7
(58) Field of Classification Search .......... 386/1, 386/45, 46, 125–126; 360/7; 369/7, 60.01; 348/552, 559; H04N 5/76, 5/92, 5/14, 5/783, H04N 9/79
See application file for complete search history.

(56) References Cited

U.S. PATENT DOCUMENTS

| | | | | | |
|---|---|---|---|---|---|
| 5,241,428 | A | * | 8/1993 | Goldwasser et al. | 386/109 |
| 5,555,463 | A | * | 9/1996 | Staron | 348/560 |
| 5,701,383 | A | * | 12/1997 | Russo et al. | 386/46 |
| 6,477,312 | B1 | * | 11/2002 | Houston | 386/46 |
| 6,614,986 | B1 | * | 9/2003 | Tognazzini | 386/46 |
| 2002/0048448 | A1 | * | 4/2002 | Daniels | 386/40 |

* cited by examiner

*Primary Examiner*—Thai Tran
(74) *Attorney, Agent, or Firm*—Trop, Pruner & Hu, P.C.

(57) ABSTRACT

A audio stream may include portions that are stored while other portions are being displayed. In one embodiment, a portion of the audio stream may be stored in digital storage media at one instance while in the next instance another portion of the stream is being read out of the storage media.

20 Claims, 13 Drawing Sheets

TIME SHIFTING BY CONCURRENTLY RECORDING AND PLAYING AN AUDIO STREAM

CROSS-REFERENCE TO RELATED APPLICATION

This is a continuation-in-part of U.S. patent application Ser. No. 08/996,535 filed Dec. 23, 1997 now U.S. Pat. No. 6,480,667.

BACKGROUND

This present invention relates to the recording and playing back of an audio stream. An audio stream includes any combination of audio and/or audio data streams.

Audio streams have typically been recorded on analog media such as a cassette recorder. The audio stream may come via a broadcast signal, via cable, via satellite signal, or from another playback device. Once the audio stream has been recorded, the recorder is used to rewind the recording medium and play what was recorded. However, due to the nature of the analog medium, once the recorder has started recording, it is not possible to play back the portion of the audio stream that has already been recorded until the recording session is terminated.

Thus, there is a need for an improved way of recording portions of audio transmissions.

DETAILED DESCRIPTION

Figure 1:
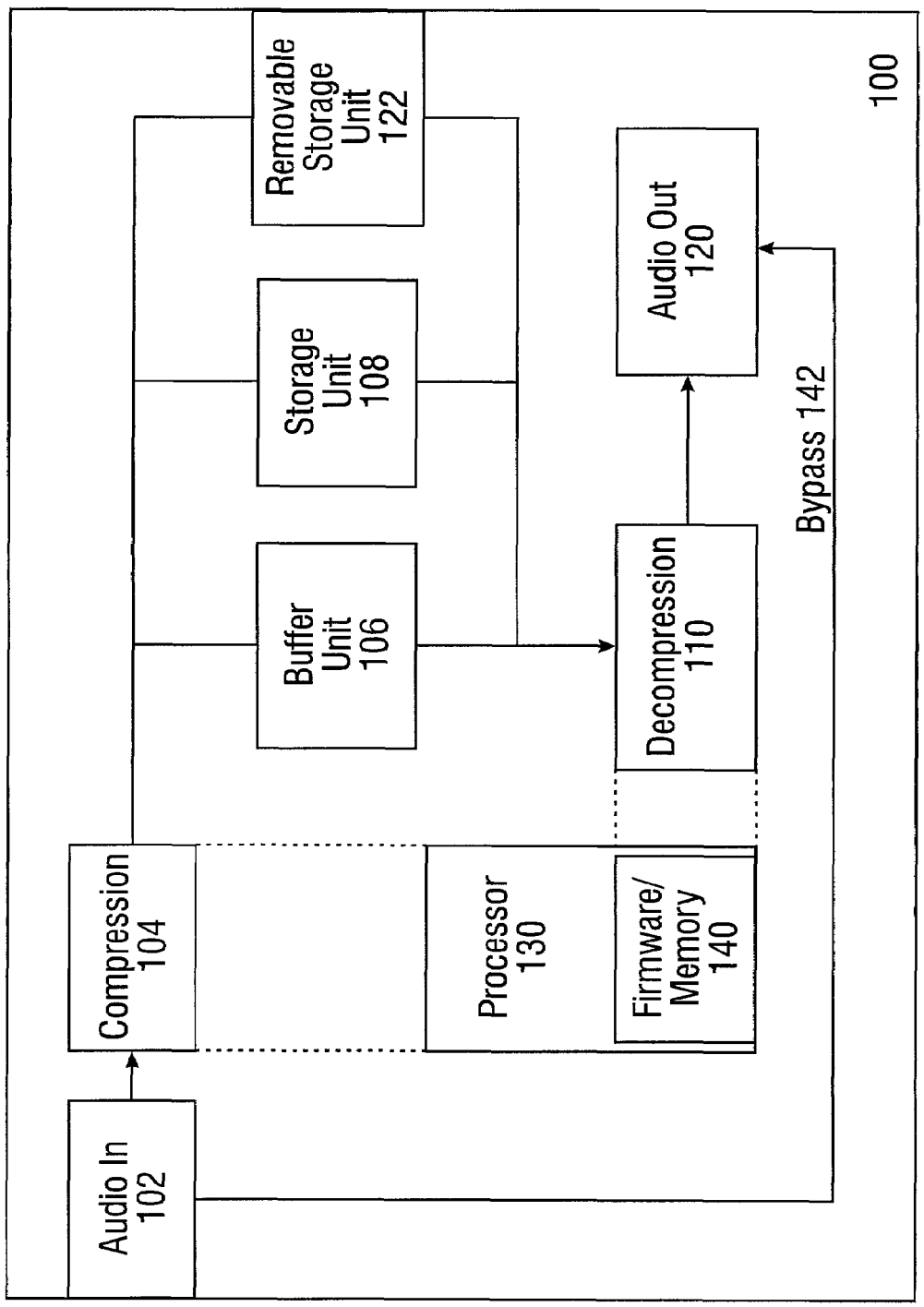
FIG. 1 is a block diagram of a record and playback system in accordance with one embodiment of the invention.

FIG. 1 shows a block diagram of a audio record and playback system 100 in accordance with one embodiment of the invention. A audio stream is received at the audio input port 102. The audio stream may be provided by a radio broadcast, cable, or satellite signals, or another audio playback device. In one embodiment, an analog-to-digital conversion may be performed on an analog audio stream to form a digital audio bit stream. In a different embodiment, the audio is already in digital form. The audio record and playback system 100 may be part of a system, such as a computer system or set top box, such that the audio input port 102 may be part of a audio capture card in the computer system or set top box.

The digital audio stream from the audio input port 102 is optionally compressed at compression unit 104. In one embodiment, the audio is already compressed and no further compression is needed. The audio stream is then stored in the storage unit 108. A buffer unit 106 may be used as temporary storage for providing larger sequential blocks of audio data to the storage unit 108. In one embodiment, the buffer unit 106 comprises a random access memory that allows relatively quick access to any portion of the stored audio stream.

The audio stream is played back by reading the audio stream from the storage unit 108. If the audio stream was compressed in compression unit 104, then a decompression unit 110 decompresses the retrieved audio stream. The audio stream is provided from a audio output port 120, to a monitor or other display device such as a TV to provide sound and/or audio to a user.

A removable storage unit 122 may also be included in audio record and playback system 100, Examples of removable storage units include a writeable compact disk read only memory (CD-ROM), writeable digital audio disk (DVD), a flash memory, or another hard disk. The availability of a removable storage unit 122 allows a user to transfer a recording of a audio stream stored in storage unit 108 to the removable storage unit 122 and then to transfer the unit 122 to another system at a different location.

In one embodiment, a processor 130 controls the operations of the audio record and playback system 100. The compression unit 104 and decompression unit 110 may be implemented in hardware, or the compression and decompression functions of units 104 and 110 may be performed by the processor 130. Processor 130 receives instructions from firmware/memory 110, using technology that is well known.

Figure 2:
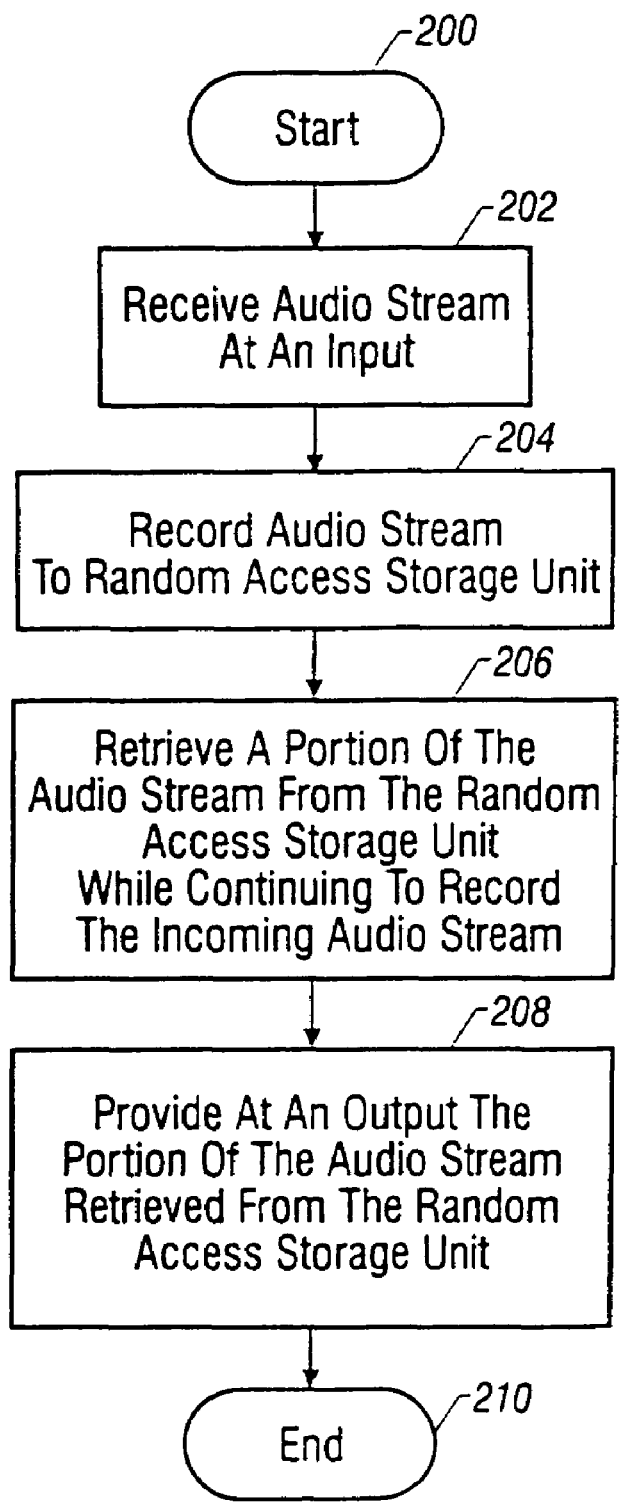
FIG. 2 is a flow chart of one embodiment of the method of providing a time-shifted stream in accordance with the invention.

FIG. 2 shows a flow chart of an embodiment of a method of providing a time-shifted audio stream in accordance with the present invention. The flow chart begins at block 200, and continues at block 202 where the audio stream is received. The recording of the audio stream begins at block 204. At block 206, playback of the recorded audio stream is performed by retrieving a portion of the audio stream from the random access storage unit while the recording of the incoming audio stream continues. The retrieved portion of the audio stream may be time-shifted from the incoming audio stream by a time delay. At block 208, the portion of the audio stream retrieved from the random access storage unit is retrieved for playback.

In this way, the record and playback functions are decoupled from one another. The user may now begin listening to recorded music from the beginning, e.g., prior to the music being completely recorded.

Figure 3:
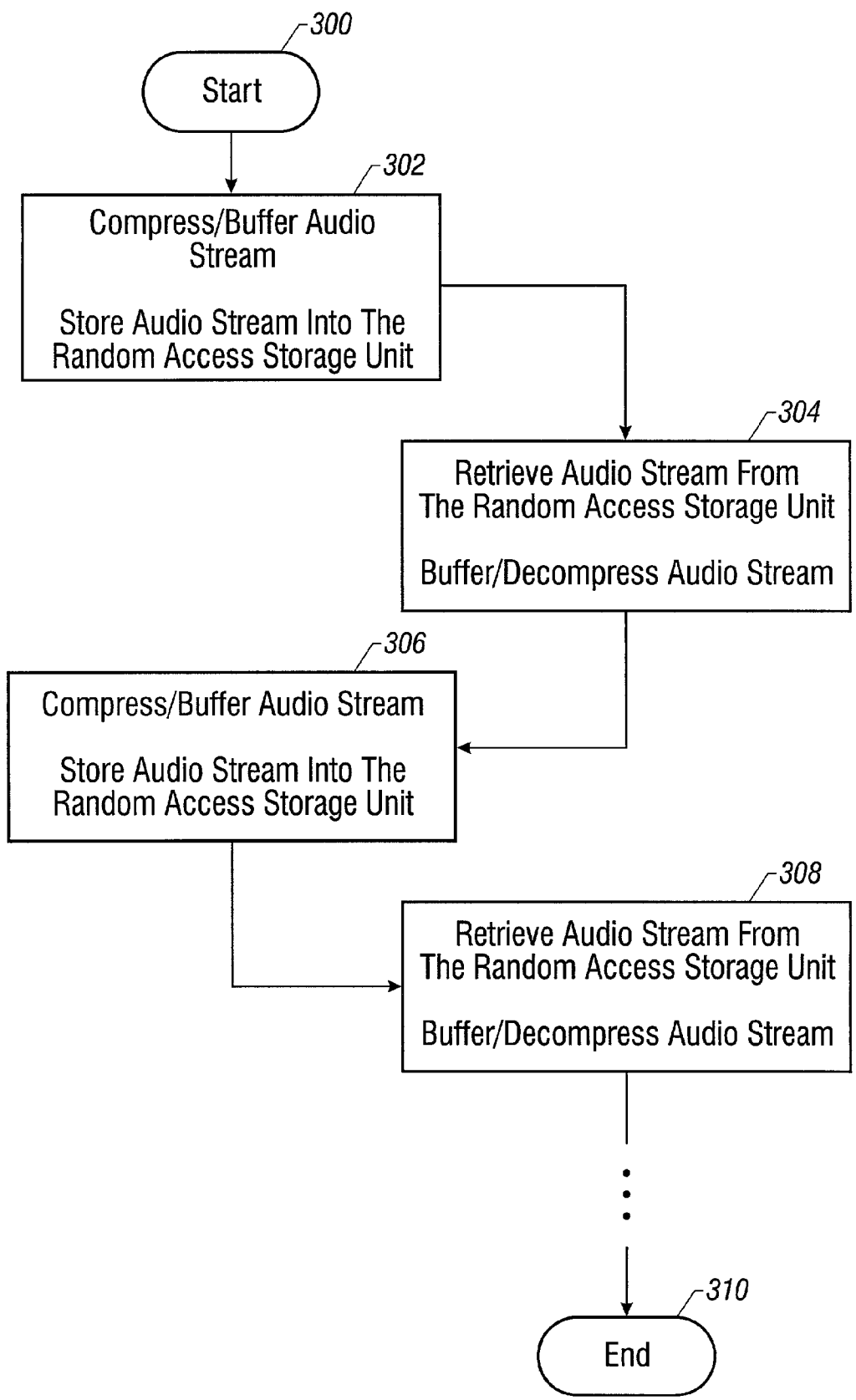
FIG. 3 shows one embodiment of performing block 206 of FIG. 2.

FIG. 3 shows an embodiment of a method for retrieving a portion of the audio stream from the random access storage unit while continuing to record the incoming audio stream in accordance with the invention, although the invention is not restricted to this embodiment. In the disclosed embodiment, the substantially simultaneous recording and playback of the audio stream is performed by multiplexing or alternately storing the audio stream to the random access storage unit and reading of the audio stream from the random access storage unit. The multiplexed or alternated stores and reads may occur quickly enough that the user does not notice an appreciable delay in the playback of the audio stream, and the incoming audio stream is not lost, e.g., all of the audio stream is recorded. Thus, the record and playback are substantially simultaneous from the user's point of view.

In one embodiment, the random access storage unit comprises a hard disk. The retrieval of the time-shifted audio signal from the hard disk is performed at a first physical location (or sector) of the hard disk, and the storing to the hard disk of the incoming audio stream is performed at a different physical location (or sector) on the hard disk. Because it takes more time to jump back and forth between different sectors of the hard disk than to read and write to sequential locations in the same sector, data may be buffered to reduce the number of accesses to and from the hard disk using buffer 106. This increases the amount of data transferred per access.

Additionally, because of time constraints for reading and writing to the hard disk, data may be compressed and decompressed to speed transfers to and from the hard disk.

In block 302, the audio stream is stored in a random access storage unit. The audio stream is optionally compressed and/or buffered prior to storage. In block 304, the audio stream is retrieved from the random access storage unit. Buffering and/or decompression may be performed before providing the retrieved audio stream to the audio output port 120.

The next portion of the audio stream is stored (block 306) as described in block 302. At block 308, the next portion of the audio stream is retrieved as described in block 304. This process is repeated until either the recording or playback cycle is terminated.

Figure 4:
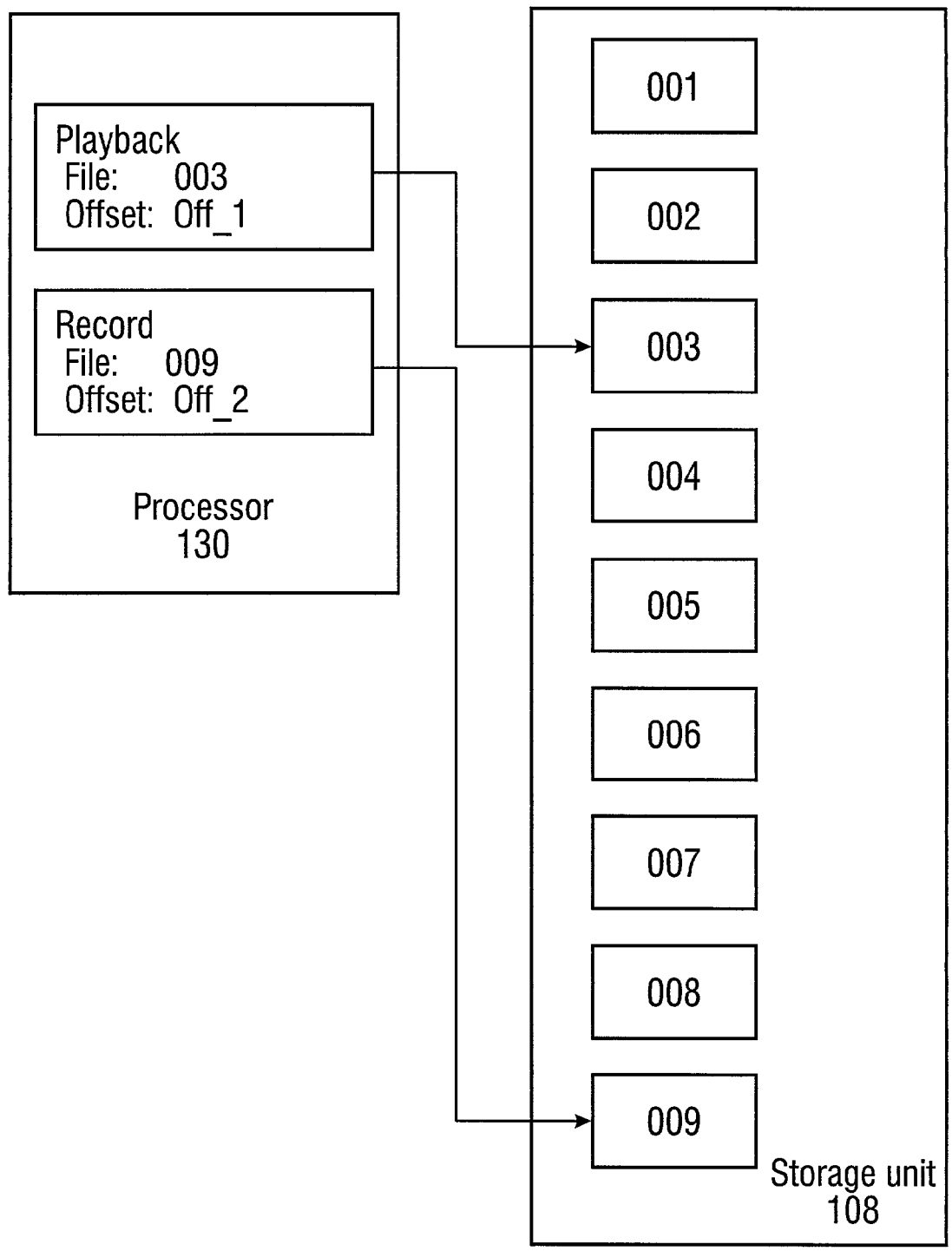
FIG. 4 shows one embodiment of an apparatus for storing the stream on a hard disk in accordance with the invention.

FIG. 4 shows one embodiment of an apparatus for storing the audio stream in the storage unit 108 in accordance with the invention. Again, the invention is not restricted in scope to the illustrated embodiments. In this embodiment, the audio stream is stored as separate files 001 and 009 on a hard disk, for example. The processor 130 keeps track of the file and offset into the file of the data being played back, as well as the file and offset into the file of the data being recorded. If the random access storage unit is fast enough, more than one audio stream may be recorded and played back at the same time.

Due to the nature of the random access storage unit being capable of easily recording over itself, the random access storage unit may act as a temporary buffer for recording the latest portion, or X number of minutes, of an incoming audio stream, where X is set up based upon the size of the storage unit in this particular embodiment. In one embodiment, X could be set up to be the entire storage unit. As newer portions of the audio stream are received, they overwrite the older portions of the audio stream saved in the random access storage unit. In this manner, the temporary buffering of the audio stream acts as a circular buffer. In one embodiment, the processor 130 maintains pointers to the beginning and ending points of the temporary buffer. The processor 130 reassigns the pointers as newer portions of the audio stream are received and/or older portions of the audio stream are overwritten.

Figure 5:
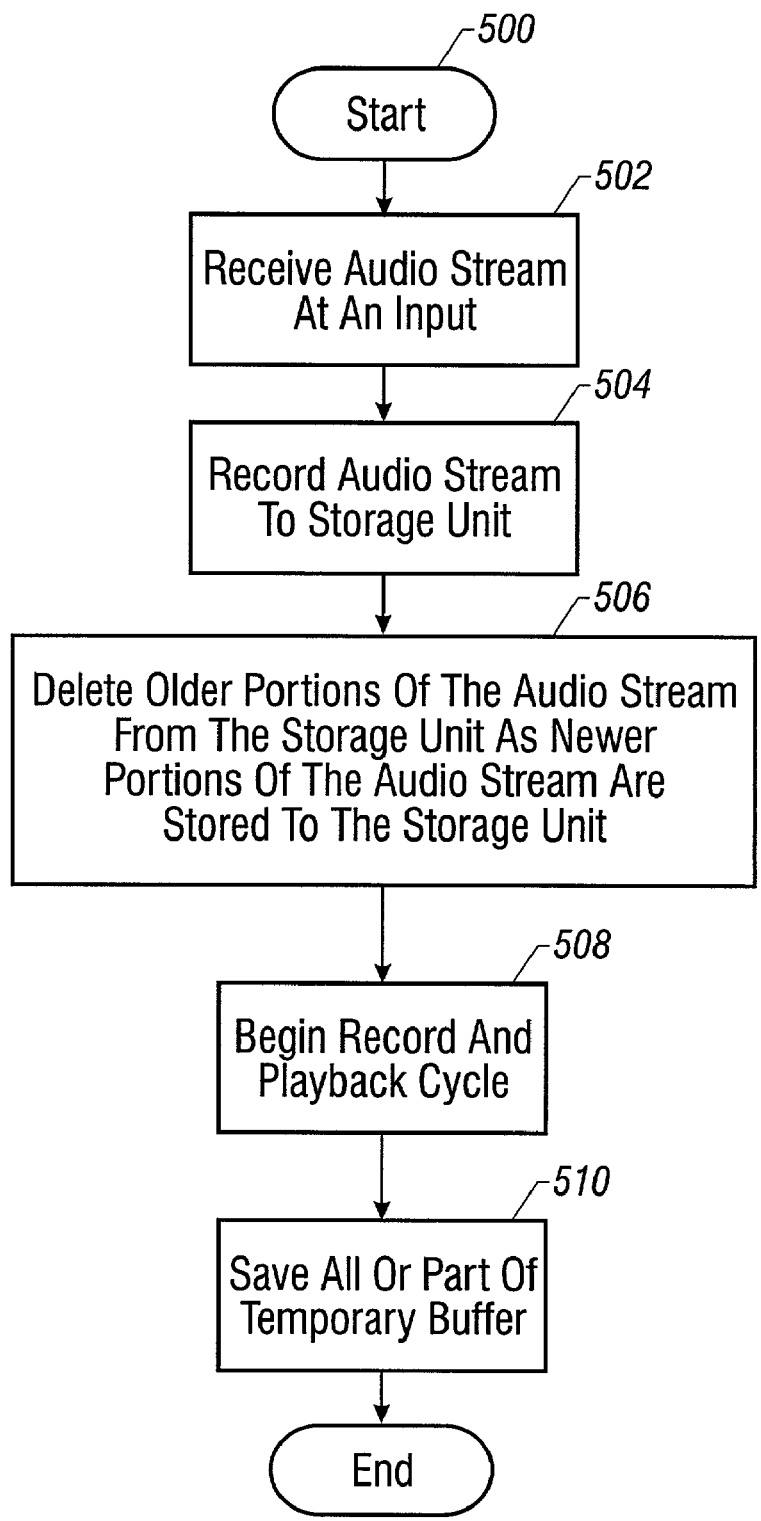
FIG. 5 shows an embodiment of a method of using the storage unit as a temporary buffer in accordance with the invention.

FIG. 5 shows a flow chart 500 of an embodiment of one method for using a temporary buffer in accordance with the invention. At block 502, the audio stream is received at an input. Recording of the audio stream to the storage unit begins at block 504. At block 506, older portions of the audio stream are deleted as newer portions of the audio stream are stored to the storage unit.

A user may initiate a playback cycle following block 506. For example, this may occur when the user wishes to replay an audio clip that he just listened to. In one embodiment, the user stops recording to the temporary buffer and plays back the last portion of the temporary buffer.

However, it may be more desirable to the user to be able to continue recording as shown at block 508. A record and playback cycle (as described with respect to FIG. 2) is started, in which the incoming audio stream is recorded while the user replays the last portion of the temporary buffer. In this manner, after replaying the desired audio clip, the user can resume sequentially listening to the audio stream from the current point of the incoming audio for substantially simultaneous playback and record.

At block 510, after the record and playback cycle is completed, all or part of the temporary buffer may be saved. Since the temporary buffer stores the latest X minutes of the audio stream prior to the record and playback cycle, all or part of the temporary buffer may be allocated to the portion of the audio stream saved during the record and playback cycle. Other portions of the audio stream may then be deleted from the storage unit, or they may be marked as overwriteable and used as a new temporary buffer.

Figure 6:
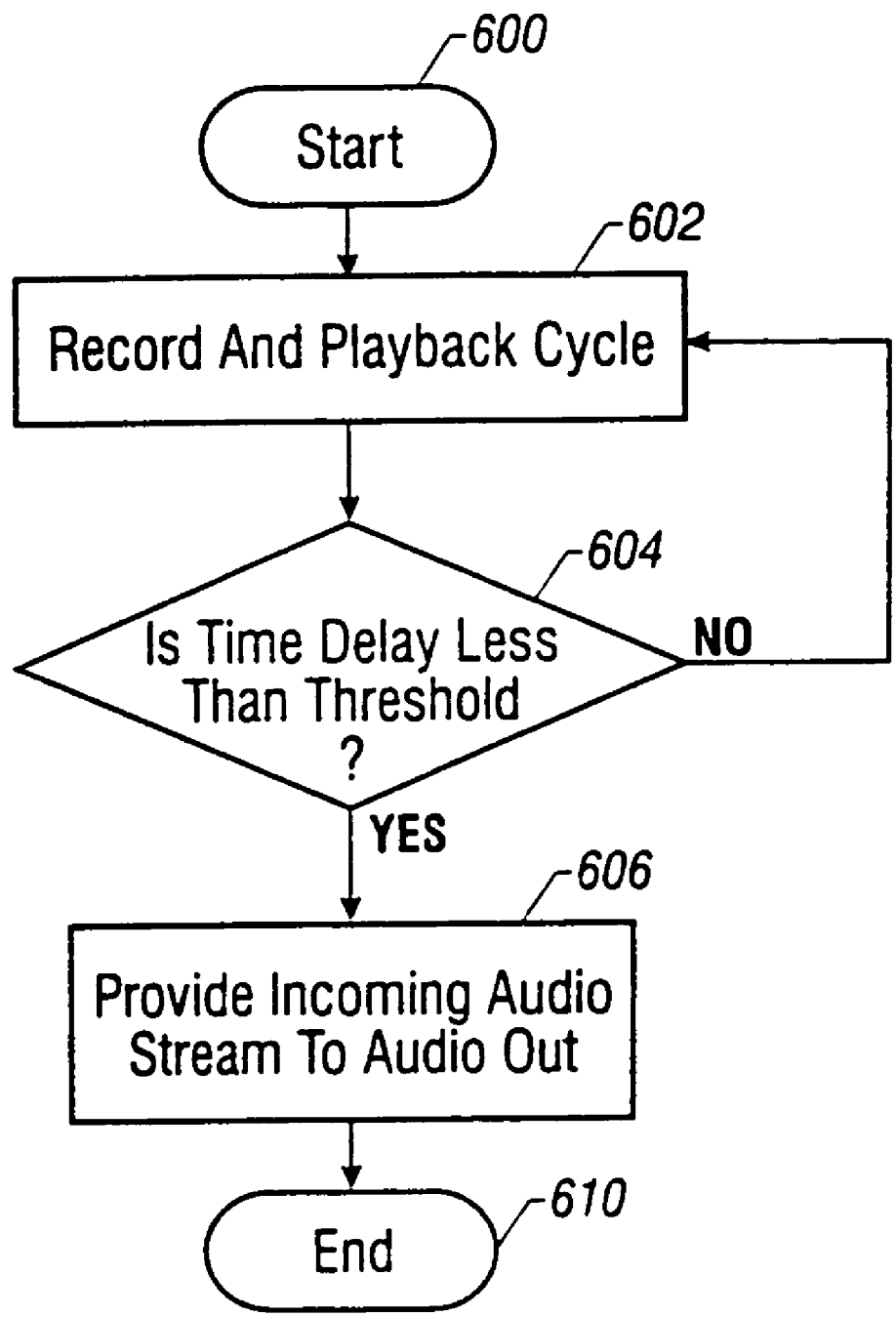
FIG. 6 is a flow chart of the playback of a audio stream catching up to the incoming audio stream for one embodiment of the invention.

FIG. 6 illustrates an embodiment of a method for playing back a audio stream to allow the playback to catch up to the incoming audio stream in accordance with the invention. If the playback is performed at an overall rate faster than the rate at which the incoming audio stream is received, then the playback may catch up to the incoming audio stream.

For example, playback of the audio stream may have an overall rate faster than the rate of the incoming audio stream if the playback is fast forwarded, or if segments of the playback are skipped altogether. When the time delay of the time-shifted audio stream being played back falls below a certain threshold, the audio playback system 100 will cease providing the time-shifted audio stream from the storage unit. Instead, the incoming audio stream will be provided to the audio output port 120 directly. In one embodiment, a bypass 142, as shown in FIG. 1, allows the incoming audio stream to be provided to the audio output port 120 directly.

When this happens, the user has caught up to the "live" broadcast, e.g., the incoming audio stream in this embodiment. The user may terminate the recording cycle, if he wishes. Alternatively, the user may put the audio record and playback system 100 back into the temporary buffering mode in which only the latest portion of the audio stream is stored.

Figure 7:
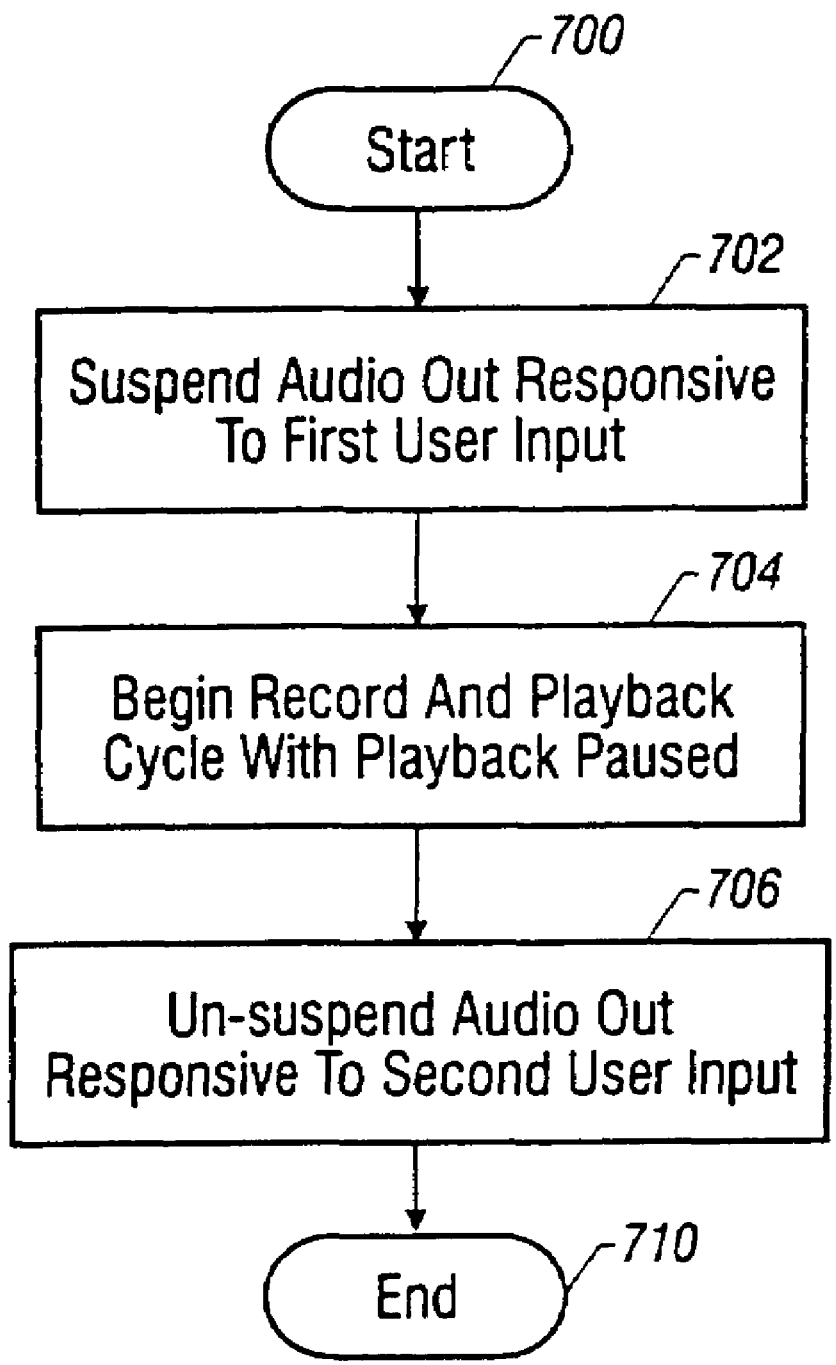
FIG. 7 shows another embodiment, in which the user is able to suspend the display of the incoming audio stream in accordance with the invention.

FIG. 7 shows an embodiment in which the user is able to suspend the play of the incoming audio stream. This can be used for example, when the user is interrupted, and wishes to continue listening to the audio stream after the interruption. When interrupted, the user signals to the audio stream and playback system 100 to suspend the play of incoming audio stream. This can be done via a remote control, for example. At block 702, the audio output signal is suspended.

At block 704 the incoming audio stream is recorded but is not played. Instead the playback is paused at the point at which the user indicated that the incoming audio stream be suspended. When the user is ready to listen to the audio stream again, he or she can signal the audio record and playback system 100 to un-suspend the audio stream so that it plays back from the point at which the audio stream was suspended, as shown in block 706.

The user may then listen to the audio stream time shifted by the amount of time that he suspended the incoming audio stream, or he may fast forward (or rewind) through the time-shifted audio stream. When playback of the time-shifted audio stream catches up to the point at which the incoming audio stream is being recorded, the record and playback system 100 may display the incoming audio stream directly from incoming audio stream without retrieving the audio stream from the storage unit, as described with respect to FIG. 6. The recording of the audio stream may then be terminated by the user, if desired.

Figure 8:
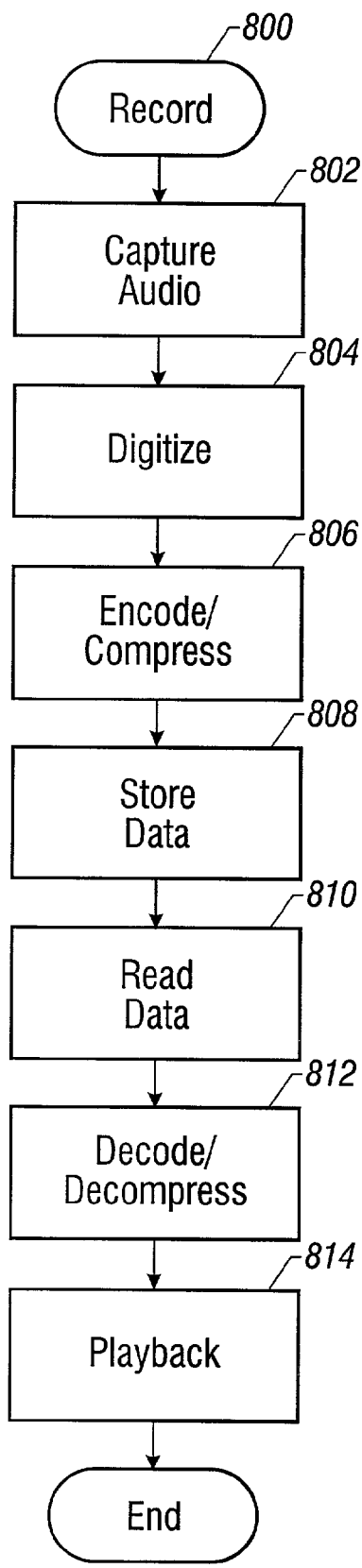
FIG. 8 is a flow chart showing one embodiment of a system for recording and playing back a audio stream in accordance with the invention.

Referring now to the embodiment shown in FIG. 8, a flow chart 800 for digitally recording a audit stream in accordance with an embodiment of the invention begins by capturing the audio stream as indicated in block 802. If the stream is an analog stream, it may be digitized in an analog-to-digital conversion process as indicated at block 804. Next, the digital stream may be encoded and compressed, as indicated in block 806. The stream is alternately read, as indicated at block 810, and stored, as indicated in block 808, in a conventional storage device such as a hard disk drive, a digital audio disk or a flash memory. Data that is read from the storage device may be decoded and decompressed using conventional technology, for example, as indicated in block 812, for display as indicated in block 814.

Figure 9:
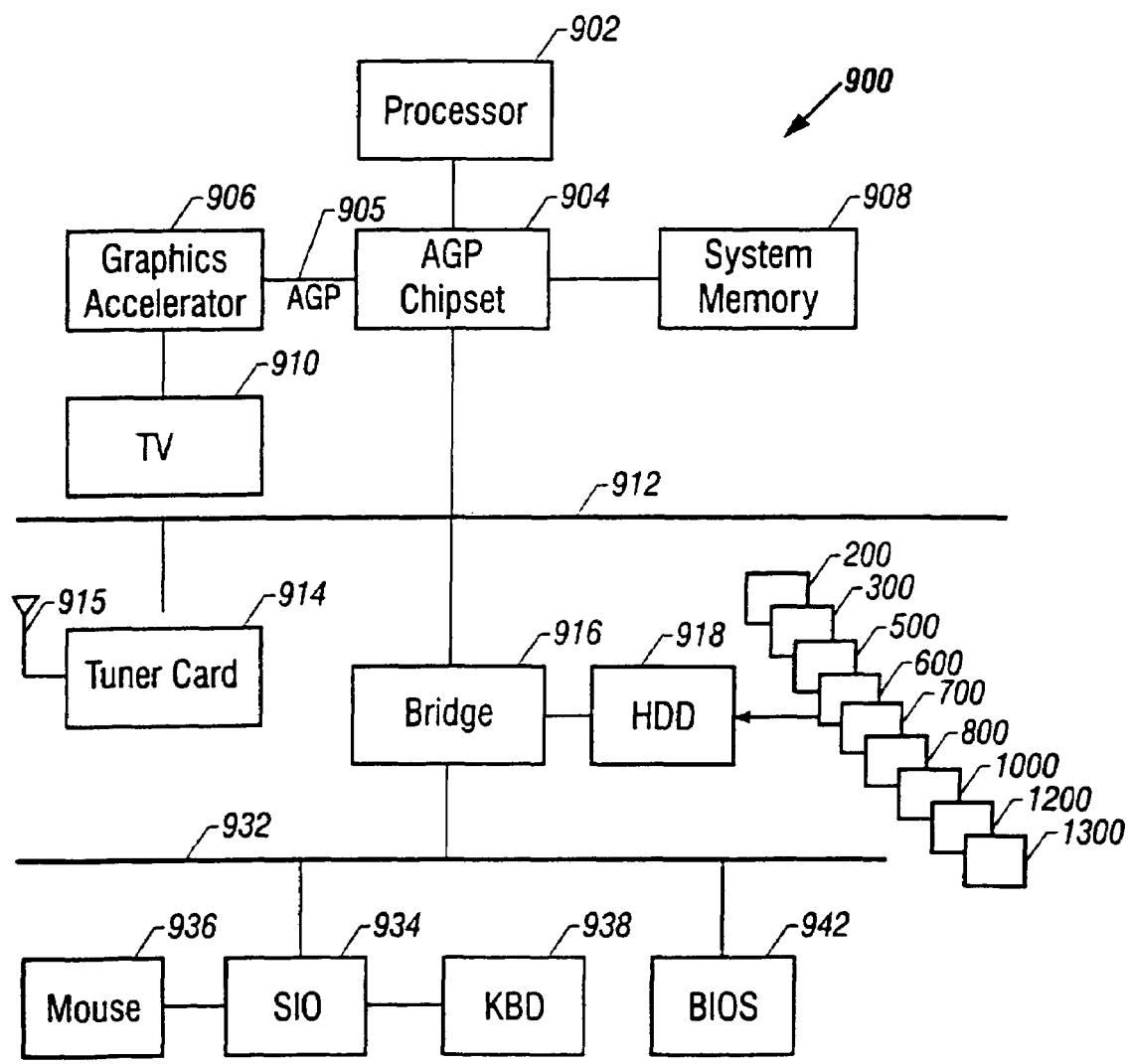
FIG. 9 is a block diagram of a computer system useful in implementing one embodiment of the present invention.

A system 900 in accordance with one embodiment of the present invention, shown in FIG. 9, includes a processor 902. In one embodiment, the processor may be coupled to an accelerated graphics port (AGP) chipset 904 for implementing an accelerated graphics port embodiment. The chipset 904 communicates with the AGP port 905 and the graphics accelerator 906. The television 910 may be coupled to the audio output of the graphics accelerator 906. The chipset 904 accommodates the system memory 908. The chipset 904 is also coupled to a bus 912 which may be, for example, a peripheral component interconnect (PCI) bus (PCI Local Bus Specification, Version 2.1 Jun. 1, 1995). The bus 912 couples to tuner card 914 which is coupled to an antenna 915 or other audio input port, such as a radio input port, a satellite receiver/antenna or the like. The tuner card 914 selects a desired radio channel and also performs the audio capture function (block 802, FIG. 8).

The bus 912 is also coupled to a bridge 916 which couples a hard disk drive 918. The software 200, 300, 500, 600, 700, 800, 1000, 1200 and 1300 may be stored on the hard disk 918. The bridge 916 is also coupled to another bus 932. The bus 932 may be coupled to a serial input/output (SIO) device 934. The device 934 is in turn coupled to conventional components such as a mouse 936 and a keyboard 938. Also coupled to the bus 932 is a basic input/output system (BIOS) 942.

Figure 10:
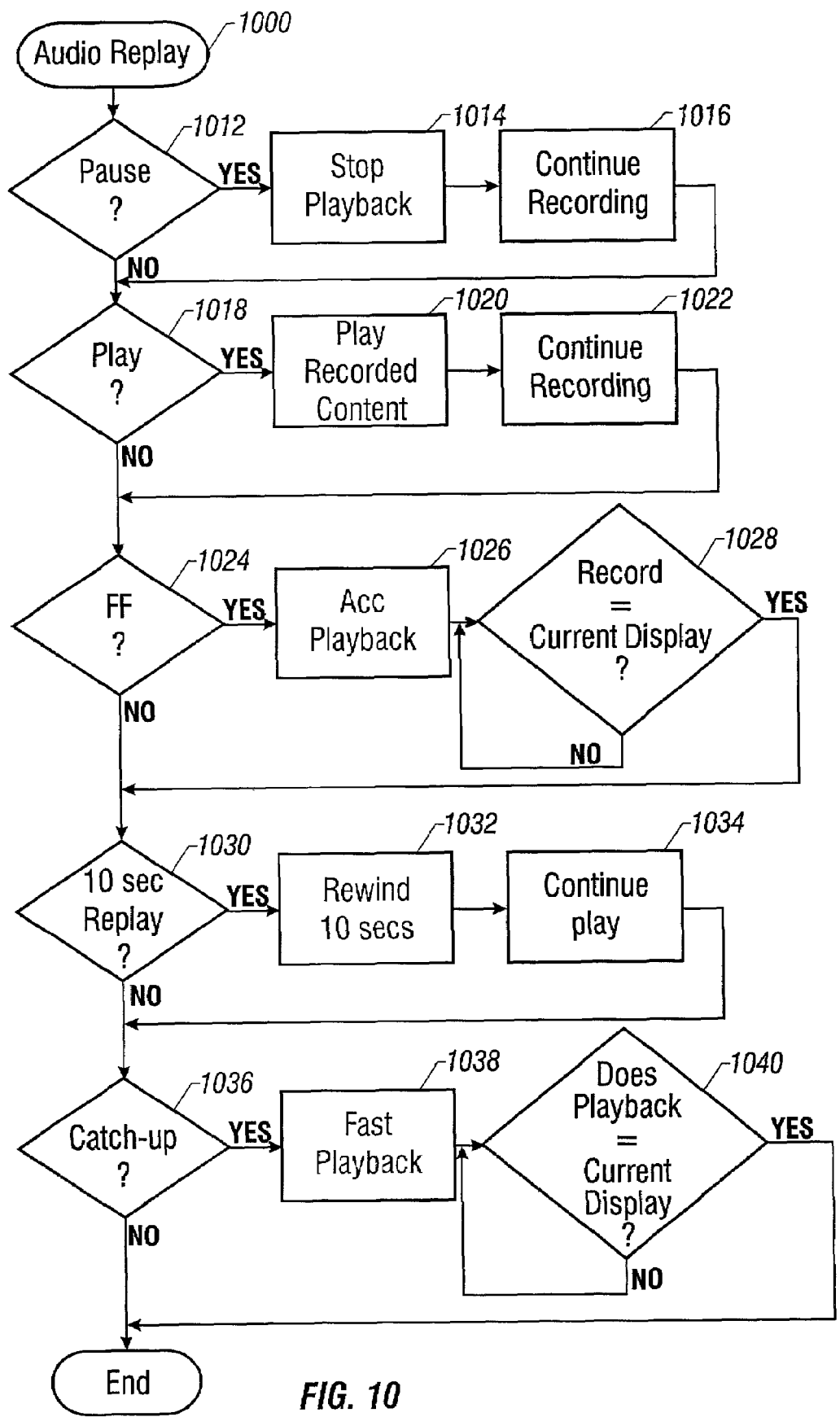
FIG. 10 is a flow chart showing the operation of another embodiment of the present invention.

The consolidated replay software 1000, shown in FIG. 10, monitors for one of a plurality of user feature selections, in one embodiment. A query is made at diamond 1012 to determine whether a pause function has been selected. If so, the playback is stopped as indicated at block 1014 but recording continues unabated as shown in block 1016.

The next check determines whether the play feature has been selected (block 1018). If so the recorded content is played thereby terminating the paused display. However, while the recorded content is played, recording continues as indicated in block 1022 so that the recorded content may be eventually played without disrupting the continuity of the playback.

A query finds out if the fast forward feature has been implemented as indicated in diamond 1024. If so, a fast playback is implemented as shown in block 1026. Once the playback equals the current broadcast or program content (diamond 1028), the flow returns to play current content. The fast forward may progress at faster than normal playback speed.

At diamond 1030 a check is done to see if the 10 second replay feature has been activated. If so, the storage device is operated to find the content which was recorded 10 seconds ago (block 1032). The recorded content is then played (block 1034) from the 10 second period back to present. After the "rewind" and playback of 10 seconds has been completed, the system is automatically transferred to automatic play at the content that was recorded while the replay is being displayed so the user does not lose any continuity. Of course, the user can set the amount of time for the replay to be something other than 10 seconds.

A catchup feature is checked (diamond 1036) and, if this feature has been selected, an accelerated playback option is implemented (as indicated in block 1038). In the accelerated playback, the playback may be slightly increased in speed so the user can easily follow a program but can make up for lost time to get back into the program as broadcast. Once the recorded program catches up to the real-time program as indicated in diamond 1040, the catchup feature is completed and the user returns to real-time display. A conventional technique may be used to maintain audio pitch during accelerated playback.

Figure 11:
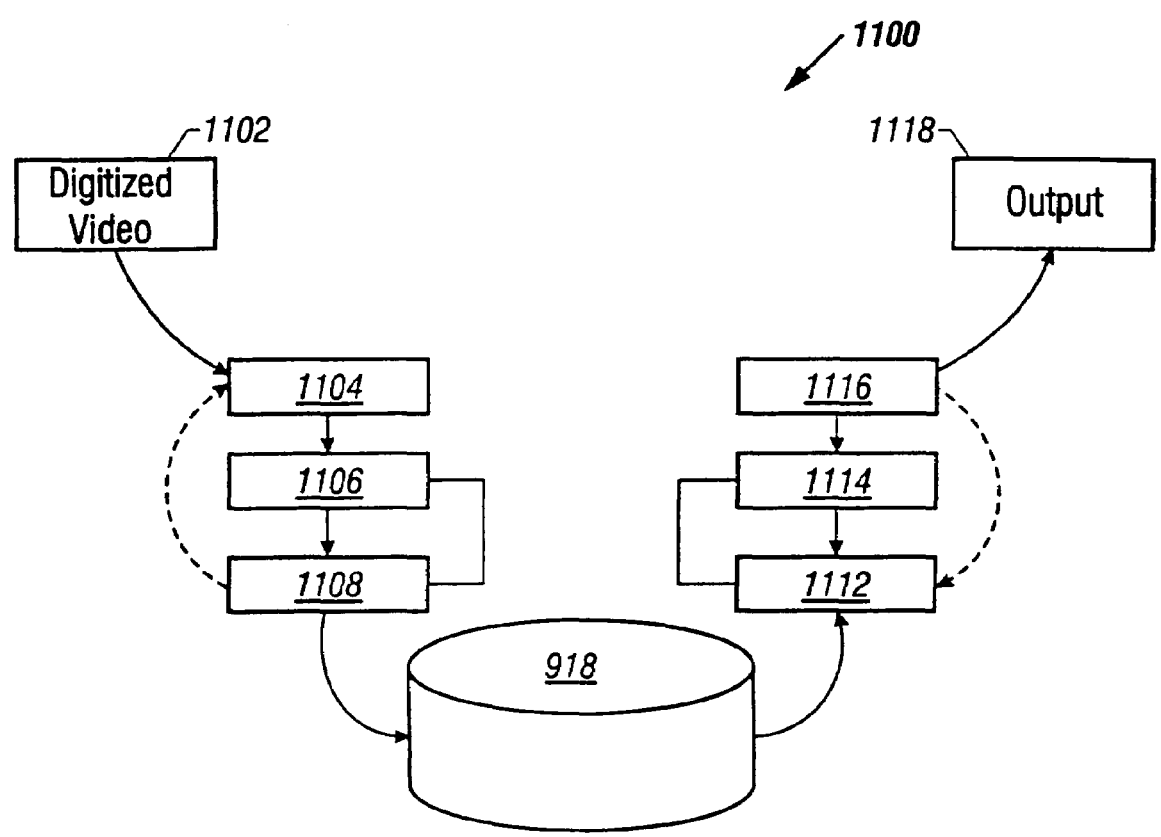
FIG. 11 is a block diagram showing how data is transferred to and from a memory device in accordance with one embodiment of the present invention.

Techniques for storing the audio stream onto the storage device 918 and for reading the information out of the storage device are summarized in Table 1 below and illustrated in FIGS. 11, 12, and 13. In FIG. 11, a schematic depiction of the storage system 1100 includes a digital storage device such as a hard disk drive 918. The digitized audio 1102 is initially stored in a buffer which is designated as being currently on the top of the memory stack. The transfer of information between the buffers and the storage device 1110 may be done in discrete time periods referred to herein as time steps.

TABLE 1

| Buffers | Time Steps | | | | | | | |
|---|---|---|---|---|---|---|---|---|
| | 2 | 3 | 4 | 5 | 6 | 7 | 8 | 9 |
| Input Storage | 1108 | 1106 | 1104 | 1108 | 1106 | 1104 | 1108 | 1106 |
| Read | X | X | 1112 1114 | X | 1114 1116 | X | 1112 1116 | X |
| Write | X | 1104 1108 | X | 1104 1106 | X | 1106 1108 | X | 1104 1108 |
| Output | X | X | X | 1114 | 1112 | 1116 | 1114 | 1112 |

(X = no action)

Figure 12:
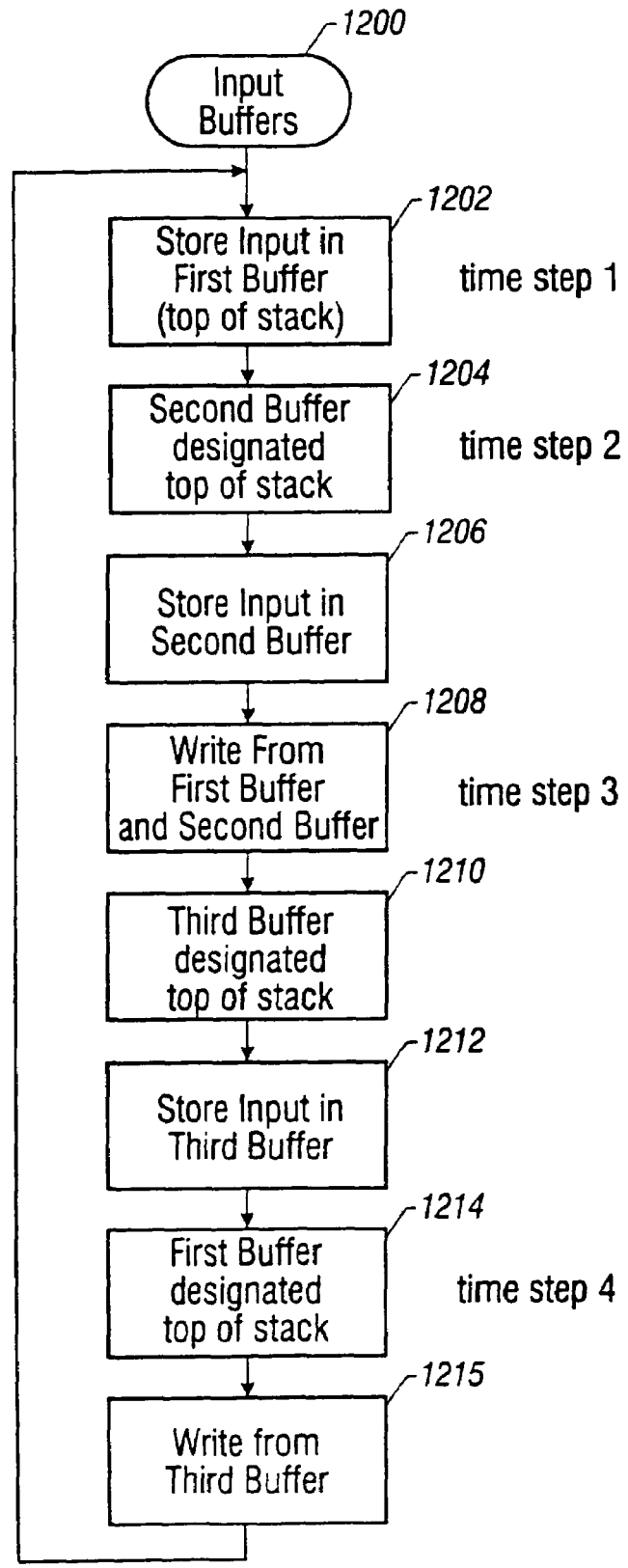
FIG. 12 is a flow chart showing the flow of input audio information into a storage device in accordance with one embodiment of the present invention.

In a first time step, shown in FIG. 12, the digitized audio 1102 (FIG. 11) is stored in memory buffer 1104 because that buffer is currently at the top of the memory stack, as indicated in block 1202 in FIG. 12.

As the buffer 1104 fills up, the buffer 1108 moves to the top of the stack (as indicated by the dashed arrow) and incoming audio is stored in buffer 1108. As indicated in block 1204 in FIG. 12 in time step 2, the buffer 1108 replaces the buffer 1104 as the designated top of the stack buffer. The next input audio is then stored in the new buffer (1108) as indicated in block 1206.

In time step 3 the buffer 1108 has filled up and the contents of buffers 1104 and 1108 are written to the storage device 1110 in a single write operation. During the same time step, buffer 1106 moves to the top of the stack and becomes the storage buffer for incoming audio. This is illustrated in blocks 1208, 1210 and 1212 in FIG. 12.

In time step 4, the buffer 1104 moves back to the top of the stack to store incoming audio since its previous content has already been saved in the storage device 1110. This is indicated in block 1214 of FIG. 12. Additionally, in time step 4, the content of buffer 1108 is written to the storage device 1110 as illustrated in block 1215. The storing of incoming information, as illustrated in FIG. 12 then cycles back to the top of the flow in FIG. 12 and continues in the same fashion thereafter.

The content from the storage device 1110 is then read into buffers 1112 and 1114 in time step 4 and block 1302.

In time step 5, the buffer 1108 moves to the top of the stack to store incoming audio, and buffer 1114 moves to the top of the output stack and transfers data to the audio output 1118. The contents of the buffers 1104 and 1106 are then written to the storage device 1110.

The time steps 1 to 5 illustrate a complete cycle from input to output. The remaining sequence of steps repeat starting at step 1 through 4 for the input of data and time steps 4 through 9 repeat for the output of data.

Figure 13:
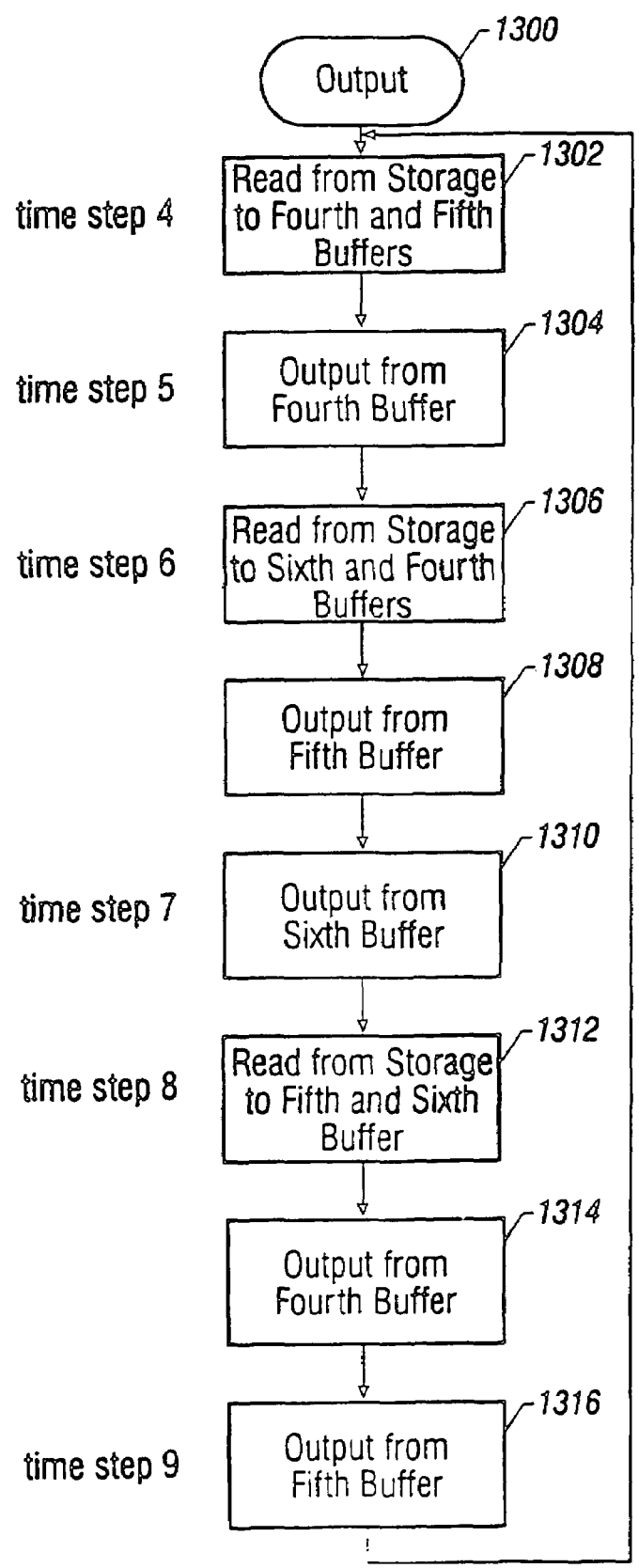
FIG. 13 is a flow chart showing the flow of data from the storage device in accordance with one embodiment of the present invention.

Referring now solely to FIGS. 11 and 13, in time step 6, information stored in the storage device is read to the sixth and fourth buffers (i.e., buffers 1114 and 1116) as indicated in block 1306. The contents of the fifth buffer (1112) are sent to the output port 1118.

In time step 7, the contents of the sixth buffer (which is buffer 1116) are sent to the output port 1118. No other output operations occur.

In time step 8, the contents from the storage device 1110 are read into the fifth and sixth buffers (buffers 1112 and 1116) as indicated in block 1312. Also the contents of the fourth buffer (buffer 1114) are passed to the output port 1118 as indicated in block 1314.

Finally, during time step 9 the contents of the fifth buffer (buffer 1112) are passed to the output port 1118, completing the cycle.

Using these techniques, the storage device is provided with enough time, through the operation of the buffers, to write the incoming audio while supplying enough data simultaneously to the output display. Since the memory is used to make sure no content is dropped at the input end and the display is never starved at the output end, continuous display can be provided without losing information. In addition reading and writing larger chunks of data at one time reduces the amount of storage device head movement, thereby allowing the storage device to keep up with the read and write requests.

The size of the individual buffers 1104 to 1108 and 1112 to 1116 ("B") in megabytes is dependent at least in part on a number of factors including the input/output data rate "D", for example in megabytes per second, the effective bandwidth of the storage device when reading or writing "S", for example in megabytes per second, and the average seek time for the storage device per transaction "t", in microseconds. The time that it takes to fill up one memory buffer (B divided by D) is advantageously greater than the time it takes to read or write two memory buffers (2B divided by S) plus the average seek time (t):

$$\left(\frac{B}{D}\right) \geq \left(\frac{2B}{S}\right) + \left(\frac{t}{1000000}\right)$$

Solving for the minimum buffer size in the above equation yields the following equation which gives the minimum buffer size:

$$B \geq \left(\frac{DS}{S-2D}\right) \times \left(\frac{t}{1000000}\right)$$

In one embodiment, the system may also function as an MP3 (Moving Pictures Experts Group (MPEG-1) Part 3 ISO/IEC 11172-3 (1993)) player/recorder that can download and record audio from the Internet. In this way, the same storage may be used for example to store and replay radio and Internet originated audio files.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    enabling an audio stream to be received;
    enabling the audio stream to be recorded on a random access storage unit;
    enabling a portion of the audio stream to be retrieved from the storage unit while continuing to record the audio stream, including enabling a portion of the video stream to be retrieved shifted by a time delay; and
    wherein after the time delay falls below a predetermined threshold, enabling the retrieving of a portion of the audio stream from the storage unit to be discontinued.

2. The method of claim 1 wherein enabling an audio stream to be received includes enabling a radio broadcast to be received.

3. The method of claim 1 wherein enabling an audio stream to be recorded includes enabling the audio stream to be recorded to a hard disk drive.

4. The method of claim 1 including enabling the initiation of one or more storage operations of the audio stream into a random access storage unit and enabling initiation of one or more random access reads of the audio stream from the random access storage unit, wherein the one or more stores are multiplexed with the one or more reads.

5. The method of claim 4 including enabling the one or more reads of the audio stream from the storage unit to be used to playback the audio stream at a rate faster than it is being stored.

6. The method of claim 5 wherein after the time delay fails below a predetermined amount of time, enabling the one or more reads from the storage unit to be terminated.

7. The method of claim 5 including enabling the one or more reads to access the audio stream offset by a time delay from the audio stream being stored, the time delay being variable over time.

8. The method of claim 1 including enabling the audio information to be stored as received, for playback in the sequence the information was received and allowing playback of any portion of the stored audio information while continuing to store the incoming audio information.

9. The method of claim 1 including allowing the playback of the audio information to be paused while continuing to store the incoming audio information.

10. The method of claim 1 including enabling automatic playback of a portion of said stored audio information having a predetermined duration.

11. An article comprising a medium storing instructions that, if executed, enable a processor-based system to:
receive an audio stream;
record the audio stream to a random access storage unit;
retrieve a portion of the audio stream from the storage unit while continuing to record the audio stream, a portion of the video stream retrieved shifted by a time delay; and
wherein after the time delay falls below a predetermined threshold, enabling the retrieving of a portion of the audio stream from the storage unit to be discontinued.

12. The article of claim 11 further storing instructions that enable the processor-based system to receive a radio broadcast.

13. The article of claim 11 further storing instructions that enable a processor-based system to record the audio stream to a hard disk drive.

14. The article of claim 11 further storing instructions that enable the processor-based system to retrieve the portion of the audio stream shifted by time delay and wherein after the time delay falls below a predetermined threshold, discontinue the retrieving of a portion of the audio stream from the storage unit.

15. The article of claim 11 further storing instructions that enable the processor-based system to initiate one or more storage operations in the audio stream into random access storage units and initiate one or more random access reads on the audio stream from the random access storage unit, wherein the one or more storage are multiplexed with the one or more reads.

16. The article of claim 11 further storing instructions that enable the processor-based system to terminate the one or more reads from the storage unit after the time delay falls below a predetermined amount of time.

17. The article of claim 11 further storing instructions that enable the processor-based system to access the audio stream by one or more reads offset by a time delay from the time the audio stream is stored, the time delay being variable over time.

18. The article of claim 11 further storing instructions that enable the processor-based system to store the audio information as received, for playback in the sequence the information was received and playback any portion of the audio information while continuing to store the incoming audio information.

19. The article of claim 11 further storing instructions that enable the processor-based system to pause the playback of audio information while continuing to store the incoming audio information.

20. The article of claim 11 further storing instructions that enable the processor-based system to automatically playback a portion of said stored audio information having a predetermined duration.

* * * * *

UNITED STATES PATENT AND TRADEMARK OFFICE
CERTIFICATE OF CORRECTION

| | | |
|---|---|---|
| PATENT NO. | : 7,062,147 B2 | Page 1 of 1 |
| APPLICATION NO. | : 09/762992 | |
| DATED | : June 13, 2006 | |
| INVENTOR(S) | : Frederick J. Cooper et al. | |

It is certified that error appears in the above-identified patent and that said Letters Patent is hereby corrected as shown below:

Column 8:
Line 56, "fails" should be --falls--.

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

PATENT NO.         : 7,062,147 B2  
APPLICATION NO. : 09/726992  
DATED                : June 13, 2006  
INVENTOR(S)       : Frederick J. Cooper et al.

Page 1 of 1

It is certified that error appears in the above-identified patent and that said Letters Patent is hereby corrected as shown below:

Column 8:  
Line 56, "fails" should be --falls--.

This certificate supersedes Certificate of Correction issued September 19, 2006.

Signed and Sealed this

Twenty-fourth Day of October, 2006

JON W. DUDAS  
*Director of the United States Patent and Trademark Office*

UNITED STATES PATENT AND TRADEMARK OFFICE
CERTIFICATE OF CORRECTION

PATENT NO.         : 7,062,147 B2                                    Page 1 of 1
APPLICATION NO.    : 09/726992
DATED              : June 13, 2006
INVENTOR(S)        : Frederick J. Cooper and Dennis M. O'Connor It is certified that error appears in the above-identified patent and that said Letters Patent is hereby corrected as shown below:

Column 8
Line 35: "video" should be --audio--;

Column 9
Line 13: "video" should be --audio--.

Signed and Sealed this
First Day of May, 2012

David J. Kappos
*Director of the United States Patent and Trademark Office*